United States Patent [19]

Lanpheer

[11] 3,808,807

[45] May 7, 1974

[54] TUNING ARRANGEMENT FOR OUTBOARD MOTOR

[75] Inventor: Richard A. Lanpheer, Oshkosh, Wis.

[73] Assignee: Brunswick Corporation, Chicago, Ill.

[22] Filed: Aug. 27, 1971

[21] Appl. No.: 175,651

[52] U.S. Cl.................... 60/313, 60/314, 123/65 E
[51] Int. Cl............................................ F02b 27/04
[58] Field of Search............. 60/313, 314; 123/65 E; 181/33 D

[56] References Cited
UNITED STATES PATENTS

| 3,494,334 | 2/1970 | Johnson............................... 60/313 |
| 2,476,816 | 7/1949 | Carter................................ 123/65 E |
| 3,052,086 | 9/1962 | Kiekhaefer et al. ................. 60/314 |
| 2,102,559 | 12/1937 | Kadenacy........................... 123/65 E |
| 2,595,932 | 5/1952 | Eichelberg......................... 123/65 E |
| 3,064,417 | 11/1962 | Tryhorn et al....................... 60/314 |
| 2,581,668 | 1/1952 | Kadenacy ............................ 60/314 |

FOREIGN PATENTS OR APPLICATIONS

| 1,130,372 | 2/1957 | France.............................. 123/65 E |

Primary Examiner—Carlton R. Croyle
Assistant Examiner—Robert E. Garrett
Attorney, Agent, or Firm—William G. Lawler, Jr.; Roy T. Montgomery

[57] ABSTRACT

An improvement in the exhaust system for a two-cycle engine comprising one or more sets of three cylinders connected to the crank shaft 120° apart, the exhaust ports of which communicate with a common exhaust chamber formed in association with the cylinder block. A diverging passage leading from the common exhaust chamber to a spacious exhaust tube enclosed within the drive shaft housing produces a negative pressure from a cylinders positive exhaust pulse, which negative pressure aids in scavenging the cylinder. The geometry of the diverging passage and the exhaust tube are such that a positive pulse is created by the exit of the negative pulse from said diverging passage and propagates back through the diverging passages arriving at the exhaust ports of the cylinder simultaneously with a positive pulse from a subsequently fired cylinder to aid in supercharging.

5 Claims, 12 Drawing Figures

INVENTOR
RICHARD A. LANPHEER

ATTORNEY

INVENTOR
RICHARD A. LANPHEER

BY Roy L. Montgomery
ATTORNEY

INVENTOR
RICHARD A. LANPHEER

BY Roy K. Montgomery

ATTORNEY

TUNING ARRANGEMENT FOR OUTBOARD MOTOR

In a two-cycle internal combustion engine, it is desired to efficiently scavenge each cylinder, particularly at high engine speeds, to insure removal of all of the burned fuel mixture and replace it with a fresh charge of fuel-air mixture. This will produce an increase of power for a particular size engine. Efficient scavenging is necessary at high engine speed because of the short period of time for each cycle.

However, if the cylinder is excessively scavenged, some of the fresh charge will escape through the exhaust ports increasing fuel consumption.

To prevent this increased fuel consumption due to the fresh mixture of fuel and air being pulled right through the cylinder from its intake or transfer port through its exhaust ports, a positive pressure pulse can be applied at the exhaust ports so as to supercharge the cylinder through the positive pressure pulse causing return of the fresh fuel and air mixture into the cylinder through the exhaust ports. With this arrangement, one is able to obtain increased power not only without increased fuel consumption but with a considerably lower fuel consumption.

The broad concept of aiding scavenging of a cylinder by a negative pulse and then supercharging the cylinder through the exhaust ports with a positive reflected pressure pulse has previously been suggested in an article on pages 56 to 58 of the Dec., 1970, issue of Popular Science. However, article teaches an unnecessarily complex structure, and only for a single cylinder. As the article sets forth, a much more complicated arrangement is necessary for a multiple-cylinder engine in which more than one cylinder is connected to a single exhaust system.

Furthermore, in the Popular Science article, the scavenging ans supercharging are both obtained through tuning of an exhaust system. Such an arrangement requires a relatively long exhaust system and must be tuned to a narrow band of engine RPM.

The present invention utilizes a tuned exhaust for applying a negative pulse to the exhaust ports of a cylinder to aid scavenging. In addition, the present invention produces supercharging by utilizing a positive pressure pulse from the exhaust of a later fired cylinder in conjunction with a positive pressure pulse produced from the exhaust of th cylinder itself, reflecting back from the end of scavenging tuned exhaust system.

In the present invention, each set of three cylinders of an engine is connected to a separate common exhaust chamber so that the positive pulses produced by the exhaust of each of the three cylinders, which are connected to the crankshaft 120° apart, are timed so as to arrive at the cylinder that has previously fired at a time when scavening of that cylinder has been completed so as to cause some of the fresh mixture of fuel and air which has passed through that cylinder to flow back into the cylinder through the exhaust ports. Additionally, a positive pressure pulse produced by the passing of the negative pressure wave of the exhaust gases of the fired cylinder beyond the tuned exhaust also is timed to arrive at the cylinder when scavenging has been completed so as to further aid in causing fresh mixture of fuel and air which has passed through the cylinder and into the exhaust system to flow back into the cylinder through the exhaust ports. Thus, the positive pressure pulse from the next fired cylinder in conjunction with a positive pressure pulse produced by the exit of the pressure wave of the fired cylinder from the end of the tuned exhaust pushes the fresh fuel-air mixture back into the cylinder through the exhaust ports so as to supercharge the cylinder.

Therefore, the present invention is able to obtain improved scavenging and supercharging of a set of three cylinders with only the improvement in scavenging being entirely dependent on tuning of the exhaust.

By not entirely relying upon the tuned exhaust for supercharging, the present invention is capable of supercharging the cylinders of a two-cycle engine over a relatively wide engine RPM range. Since supercharging is always desired while the improvement is scavenging by the negative pressure wave becomes desirable in the upper range of engine RPM, the present invention produces supercharging and improves scavenging at all desired engine speeds. The present invention increases the horsepower of the engine through improved scavenging and supercharging over a relatively wide range of engine speed while decreasing fuel consumption.

An object of this invention is to provide a system to effectively control the scavenging and supercharging of each set of three cylinders of a two-cycle engine that fire 120° apart with the engine having one or more sets.

Other objects of this invention will be readily perceived from the following description, claims, and drawings.

This invention relates to an outboard motor including a two-cycle engine having a crankshaft with two or more sets of three cylinders connected 120° apart to the crankshaft. Each of the cylinders has at least one exhaust port with means providing communication between the exhaust ports of the cylinders. Exhaust means, which is connected to the communication means, includes means to produce a negative pulse at the exhaust port of each of the cylinders due to the exhaust from the fired cylinder to improve scavenging of the fired cylinder. The communication means allows a positive pulse due to the firing of the next of the cylinders to be supplied to the exhaust port of the fired cylinder in conjunction with a positive pulse produced by the pressure wave from the exhaust of the fired cylinder passing beyond the negative pulse producing means to produce supercharging of the fired cylinder.

The attached drawings illustrate a preferred embodiment of the invention, in which.

Figure 1:
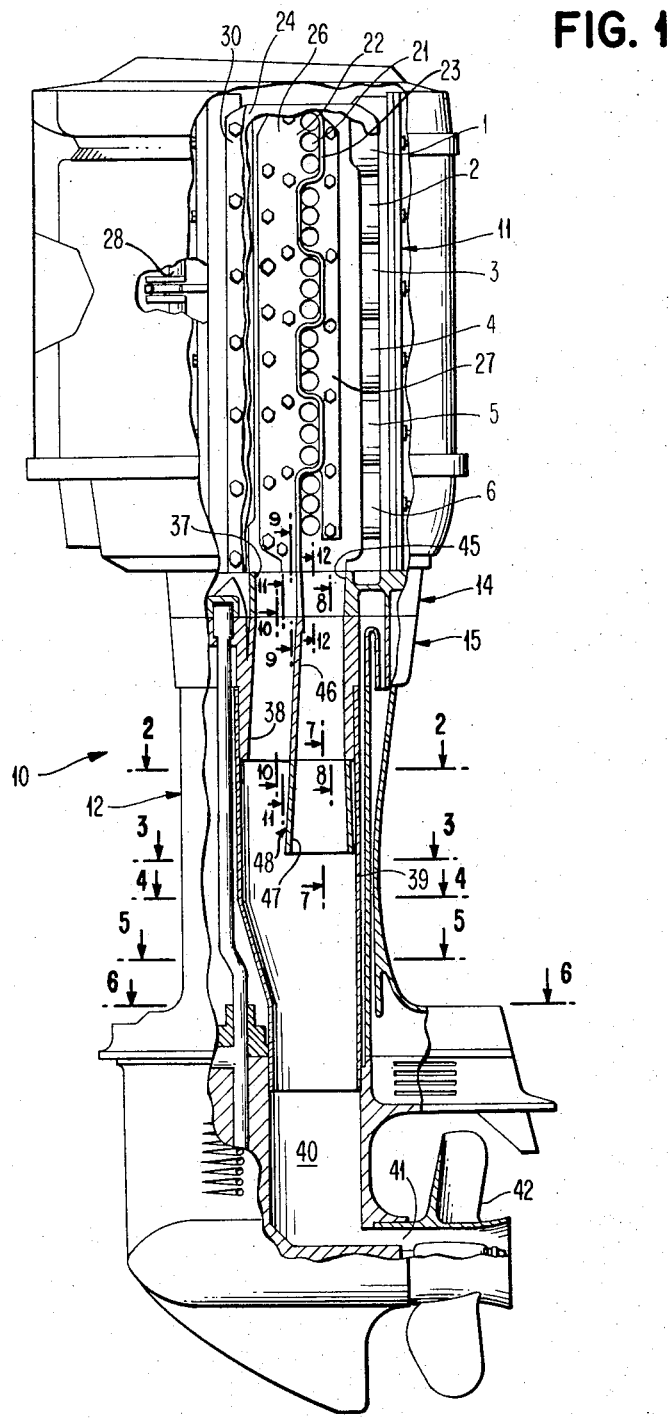
FIG. 1 is an elevational view, partly in section, of an outboard motor having an engine utilizing the tuned exhaust system of the present invention.
Figure 2:
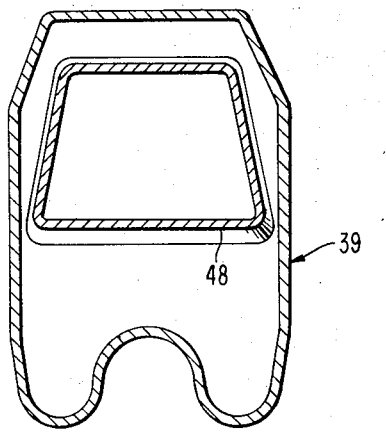
FIG. 2 is a sectional view of the exhaust tube of FIG. 1 and the exhaust megaphone and taken along line 2—2 of FIG. 1.
Figure 3:
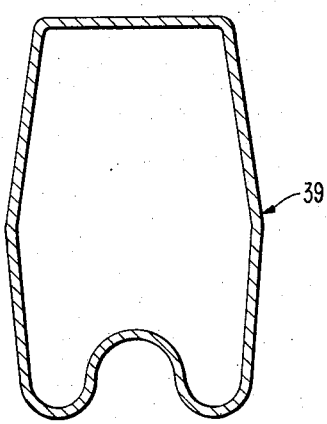
FIG. 3 is a sectional view of the exhaust tube and taken along line 3—3 of FIG. 1.
Figure 4:
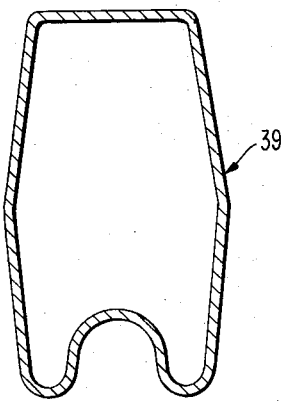
FIG. 4 is a sectional view of the exhaust tube and taken along line 4—4 of FIG. 1.
Figure 5:
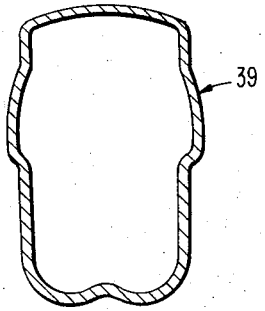
FIG. 5 is a sectional view of the exhaust tube and taken along line 5—5 of FIG. 1.

Referring to the drawings and particularly FIG. 1, there is shown an outboard motor 10 having a two-cycle engine 11 supported by a driveshaft housing 12. The engine 11 has an exhaust extension 14 at its lower end with a driveshaft housing extension 15 disposed beneath the exhaust extension plate 14 and above the driveshaft housing 12.

The engine 11 has six threaded studs 16 (two shown in FIG. 11) secured to the lower end of its cylindrical block and extending through aligned passage 17a (see FIG. 9) and 17b (see FIG. 11), respectively, in the exhaust extension 14 and the driveshaft housing extension 15 and fastened to the driveshaft housing extension 15 by the nuts 18. The driveshaft housing extension 15 is secured to the upper end of the driveshaft housing 12 by screws 19 (see FIG. 10) extending through passage 19a in the driveshaft housing plate 15 into threaded openings (not shown) in the upper end of the driveshaft housing 12. The engine 11 also has a pair of studs (not shown) extending therefrom and passing only through passages in the exhaust extension 14 so that nuts (not shown) on the pair of studs fix the exhaust extension 14 to the engine 11.

The engine 11 has six horizontally disposed cylinders 1, 2, 3, 4, 5 and 6 (see FIG. 1) in an in-line arrangement. Each of the six cylinders has its exhaust ports 21 disposed in vertical alignment with each other. The exhaust ports 21 of the first, third, and fifth cylinders are separated by a baffle from the second, fourth, and sixth cylinders.

A water jacket cover 22, which is secured to the cylinder block of the engine 11, is formed with a ridge 23 extending into an exhaust cavity in the cylinder block of the engine 11 to separate the exhaust ports 21 from each other in the manner shown in FIG. 1. An exhaust manifold baffle plate 24 (cut-away) overlies the water jacket cover 22 and has a ridge for cooperation with the ridge 23 so that two separate common exhaust chambers 26 and 27 are formed when the baffle plate 24 is secured to the cylinder block of the engine 11. The common exhaust chamber 26 communicates with the exhaust ports 21 of the first, third, and fifth cylinders while the common exhaust chamber 27 is in communication with the exhaust ports 21 of the second, fourth, and sixth cylinders.

By having the first, third, and fifth cylinders connected to the common exhaust chamber 26, there is positive pulse tuning in the common exhaust chamber 26 between the first, third, and fifth cylinders. Positive pulse tuning also is obtained in the common exhaust chamber 27 between the second, fourth, and sixth cylinders.

The natural frequency relation between the first, third, and fifth cylinders is due to the cylinders being connected 120° apart to a crankshaft 28 of the engine 11. Similarly, the second, fourth, and sixth cylinders also are connected 120° apart to the crankshaft 28 of the engine 11.

The firing order of the six cylinders is 1-4-5-2-3-6. Thus, for the first, third, and fifth cylinders, the firing order is 1-5-3.

For a particular cylinder, the exhaust ports 21 open about 97° after top dead center with the intake or transfer port opening about 18° later. Bottom dead center is reached about 65° after the intake or transfer port opens. The intake port closes about 63° after bottom dead center with the exhaust ports 21 closing about 18° thereafter. Top dead center is reached about 99° after the exhaust ports 21 close.

Consider the third cylinder 3 to have fired with its intake or transfer port and its exhaust ports 21 open. One effect of the positive exhaust pressure pulse from the third cylinder 3 is to push fuel-air mixture back into the fifth cylinder 5 until the exhaust ports 21 of the fifth cylinder close. The time of closing of the exhaust ports 21 of the fifth cylinder 5 is correlated to when the exhaust ports 21 of the third cylinder 3 open, so that the positive pressure pulse from the third cylinder 3 is effective to supercharge the fifth cylinder 5.

Similarly, when the piston in the fifth cylinder 5 goes down it opens the exhaust port and creates a positive pressure pulse. That pulse supercharges the first cylinder 1 just as its exhaust ports are closing. The positive pressure pulse from the first cylinder 1 created when the exhaust ports open serves to supercharge the third cylinder 3 whose ports are just closing.

The engine 11 has an exhaust manifold cover 30 overlying the baffle plate 24. The cover 30 is secured to the cylinder block of the engine 11. The cover 30 has water flowing therethrough prior to supply to the water jacket cover 22.

Figure 9:
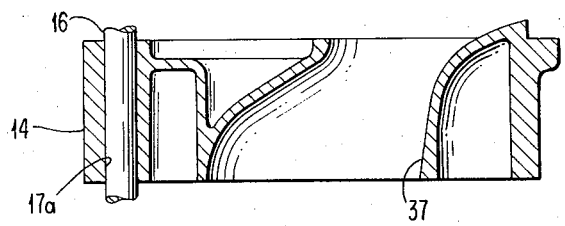
FIG. 9 is a sectional view of an exhaust passage in the exhaust extension plate and taken along line 9—9 of FIG. 1.
Figure 11:
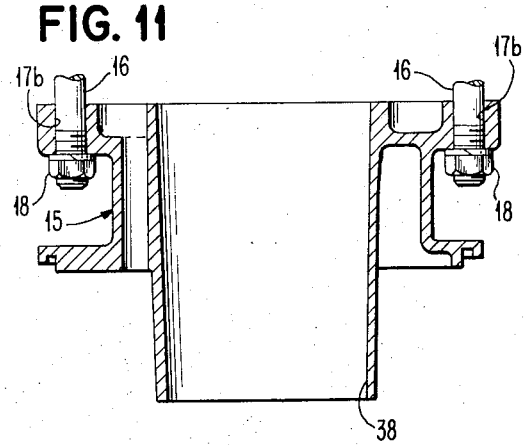
FIG. 11 is a sectional view of the diverging passage in the driveshaft housing plate and taken along line 11—11 of FIG. 1.
Figure 10:
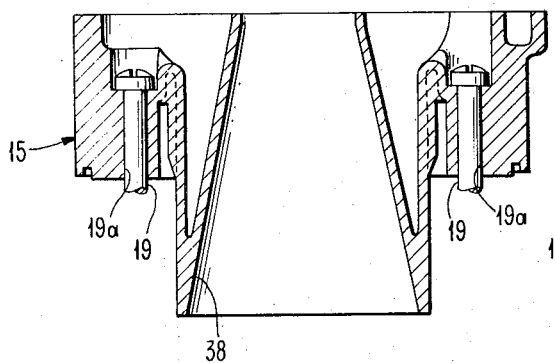
FIG. 10 is a sectional view of the diverging passage in the driveshaft housing plate and taken along line 10—10 of FIG. 1.

The bottom of the common exhaust chamber 26 communicates with a passage 37 in the exhaust extension 14. As shown in FIG. 9, two walls of the exhaust passage 37 are curved to provide communication from the bottom of the common exhaust chamber 26 to a passage 38 (see FIG. 1) in the driveshaft housing extension 15. The passage 38 in the driveshaft housing extension 15 has two diverging walls in one portion thereof as shown in FIG. 10. Another portion of the passage 38 has slightly converging walls as shown in FIG. 11. The passage 38 has a diverging area from top to the bottom to allow expansion of the pressure wave of the exhaust gases so that the wave becomes negative.

This to convert a positive pulse to a negative, and diverging area of the passage 38 functions to control the amplitude of the return negative pulse to produce the desired scavenging at a particular one of the cylinders in the common exhaust chamber 26. The timing of the return negative pulse is determined by the distance of the diverging passage 38 from the exhaust port 21 of a cylinder, the length of the pulse is determined by the length of the passage 38, and the amplitude of the return pulse is determined by the diverging angle of the walls of the passage 38. Accordingly, the angles of the two diverging walls of the passage 38 are selected to produce the desired amplitude of the return negative pulse, the passage is positioned to give the return negative pulse proper timing, and its length is determined by the desired length of the return pulse within the space limitations.

The lower end of the passage 38 extends into the upper end of an exhaust tube 39, which is supported in the driveshaft housing 12. The exhaust tube 39 extends downwardly through the driveshaft housing 12 to communicate with a passage 40 in the driveshaft housing 12 so that the exhaust gases may flow through an annular passage 41 in a propeller 42 to the water.

Figure 12:
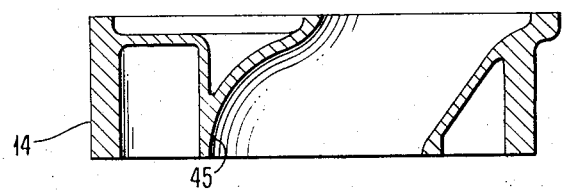
FIG. 12 is a sectional view of an exhaust passage in the exhaust extension plate and taken along line 12'12 of FIG. 1.

The lower end of the common exhaust chamber 27 communicates with a passage 45 in the exhaust extension 14. The passage 45 presents a substantially constant area as shown in FIGS. 1 and 12.

The lower end of the passage 45 communicates with a passage 46 in the driveshaft housing 15. The passage 46 (see FIGS. 1 and 8) has a substantially constant area from its upper end to its lower end since two of its walls diverge (see FIG. 1) and two if its walls converge (see FIG. 8).

Figure 7:
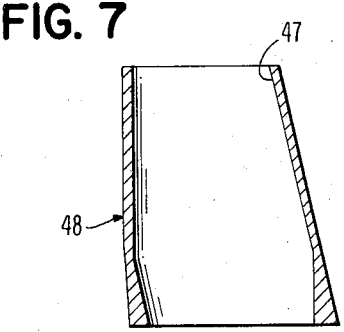
FIG. 7 is a sectional view of the passage of the megaphone and taken along line 7—7 of FIG. 1.

The lower end of the passage 46 communicates with the upper end of a passage 47 in an exhaust megaphone 48. The exhaust megaphone 48 has a diverging area from its upper end to its lower end as shown in FIG. 7. Only one of the walls of the passage 47 is tapered to any extent, and this is the right wall in FIG. 7.

Figure 8:
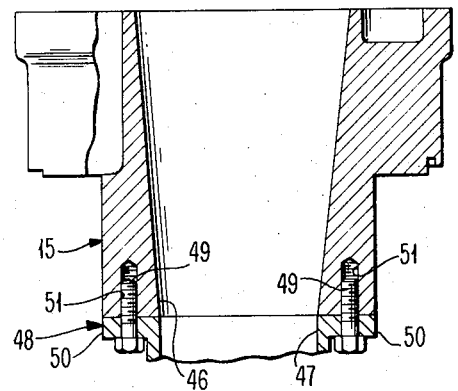
FIG. 8 is a sectional view of an exhaust passage in the driveshaft housing plate and taken along line 8—8 of FIG. 1.

The exhaust megaphone 48 is secured to the lower end of the driveshaft housing extension 15 by suitable means such as screws 49 (see FIG. 8). The screws 49 extend through ears 50 on the megaphone 48 into threaded openings 51 in the driveshaft housing plate 15.

The lower end of the megaphone 48 communicates with the exhaust tube 39 at a position further downstream than the communication of the passage 38 through the driveshaft housing extension 15 with the exhaust tube 39. This is because it is desired to have the same distance from the uppermost exhaust ports 21 (cylinder 2) in the common exhaust chamber 26 to the exhaust tube 39 as from the uppermost ports 21 (cylinder 1) in the common exhaust chamber 27 to the exhaust tube 39.

The magaphone 48 has the angle of its wall selected as known to the art so that the desired amplitude of the return negative pulse is produced thereby. Thus, the angle of the wall of the passage 47 would be increased to increase the amplitude of the return pulse and vice versa.

By selecting the diverging area of the passage 47, its position, and its length, the return negative pulses arriving in the common exhaust chamber 27 may be direct controlled so as to cooperate with the natural pulse tuning occurring within each exhaust chamber as a result of the cylinders 20 being connected to the common exhaust chamber and firing 120° apart. With the cylinders 2, 4 and 6 having their exhaust ports 21 connected to the common exhaust chamber 27 and firing in the order of 4-2-6, a return negative pulse to the exhaust ports 21 of the fourth cylinder 4 is produced by the exhaust from the firing of the fourth cylinder 4 pulse, which is produced by the natural pulse tuning between the cylinders, arrives from the exhaust of the second cylinder 2 at the exhaust ports 21 of the fourth cylinder 4 after the return negative pulse from the megaphone 48 reflected in conjunction with a positive pulse produced when the negative pressure pulse or wave of the exhaust gases of the fourth cylinder 4 reaches the end of the megaphone 48.

Theoretically this reflected positive pulse results when the rarefaction wave, produced as a cylinder's exhaust pulse proceeds out through the megaphone 48, reaches the open end of the megaphone. Here the exhaust pulse encounters an abrupt change in air density which causes formation of a positive pulse or wave. This positive wave travels, or is "reflected", back through the exhaust passage to the exhaust ports. The time of arrival of this positive reflected pulse at the exhaust ports can be controlled by tailoring the exhaust system described according to well known tuned pipe or resonating pipe theory.

Figure 6:
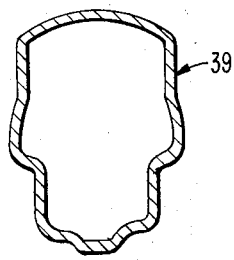
FIG. 6 is a sectional view of the exhaust tube and taken along line 6—6 of FIG. 1.

As shown in FIGS. 2 to 6, the area of the exhaust tube 39 decreases from its uppermost end until the position at which FIG. 6 is taken.

While the present invention has shown and described the engine 11 as being a six cylinder in-line engine, it should be understood that the engine 11 could be a V-6 engine. It is only necessary that the engine 11 have the cylinders as a common multiple of three with each set of three cylinders being connected to the crankshaft 120° apart and communicating with a separate common exhaust chamber.

Likewise, it is not necessary for the engine 11 to have six cylinders. Thus, any common multiple of three cylinders such as six or nine cylinders, for example, could be used. It is only necessary that each set of three cylinders be connected to a separate common exhaust chamber so that the natural pulse tuning because of the cylinders firing 120° apart is present to produce one of the positive pulses along with tuning of the exhaust to produce the negative pulses and a second positive pulse.

An advantage of this invention is that there is both tuning of the positive pulses from the cylinders and of the negative and positive pulses from the exhaust system at the same time. Another advantage of this invention is that the efficiency and performance of the engine is increased.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An outboard motor including a two-cycle engine having a crankshaft, three cylinders connected 120° apart to said crankshaft to form a set of cylinders, each of said cylinders having at least one exhaust port, means providing communication between the exhaust ports of said set of cylinders, an exhaust passage connected to said communication means, said exhaust passage comprising a diverging section open at its extremity, and an expansion chamber in communication with said diverging section said diverging section comprising means to produce from the exhaust pulse of a fired cylinder a negative pressure wave at the exhaust port of said fired cylinder to aid in scavenging said fired cylinder, and means for producing from said exhaust pulse a positive wave to arrive at the exhaust port of said fired cylinder after said negative wave, and said communication means allowing a positive wave due to firing of the next of said cylinders to arrive at the exhaust port of said fired cylinder in conjunction with said positive wave to produce supercharging of the fired cylinder.

2. The outboard motor of claim 1 in which said motor includes a driveshaft housing extending down from said engine and said exhaust passage extends into said housing.

3. The outboard motor according to claim 1 including at least two sets of three cylinders with each set of three cylinders having said cylinders connected to said crankshaft 120° apart, and said communication means comprising a common exhaust chamber for each set of said cylinders.

4. The outboard motor of claim 3 in which said motor includes a driveshaft housing extending down from said engine comprising said expansion chamber, and a separate exhaust passage extending from each of said exhaust chamber into said expansion chamber.

5. The outboard motor according to claim 4 in which each of said exhaust passages has substantially the same length and each of said exhaust passages is connected to one of said common exhaust chambers at substantially the same distance from the exhaust ports of the cylinders exhausting into such chamber.

* * * * *